(12) United States Patent
Bernhardt

(10) Patent No.: US 9,296,389 B2
(45) Date of Patent: Mar. 29, 2016

(54) MOTOR VEHICLE HAVING AUXILIARY UNITS DRIVEN BY AN ELECTRIC MOTOR

(71) Applicant: WABCO GmbH, Hannover (DE)

(72) Inventor: Dirk Bernhardt, Wunstorf (DE)

(73) Assignee: WABCO GmbH, Hannover (DE)

( * ) Notice: Subject to any disclaimer, the term of this patent is extended or adjusted under 35 U.S.C. 154(b) by 26 days.

(21) Appl. No.: 13/937,795

(22) Filed: Jul. 9, 2013

(65) Prior Publication Data

US 2014/0018206 A1    Jan. 16, 2014

(30) Foreign Application Priority Data

Jul. 14, 2012 (DE) .......................... 10 2012 014 020

(51) Int. Cl.
  *B60W 20/00*  (2006.01)
  *B60K 25/00*  (2006.01)
  *B60K 25/02*  (2006.01)
(52) U.S. Cl.
  CPC ................ *B60W 20/40* (2013.01); *B60K 25/00* (2013.01); *B60K 2025/005* (2013.01); *B60K 2025/022* (2013.01); *Y10S 903/902* (2013.01); *Y10T 477/26* (2015.01)
(58) Field of Classification Search
  USPC .................... 477/179, 181; 192/48.1, 48.601, 192/48.606, 48.607, 48.609, 48.611, 48.8
  See application file for complete search history.

(56) References Cited

U.S. PATENT DOCUMENTS 4,580,458 A * 4/1986 Gott et al. ........................ 74/359
6,520,304 B2  2/2003 Bellotti et al.

FOREIGN PATENT DOCUMENTS

| DE |    601 16 950     |  4/2006  |
|----|-------------------|----------|
| DE |  10 2005 025 567  | 12/2006  |
| DE |  10 2007 006 420  |  8/2008  |
| DE |  10 2007 038 235  |  2/2009  |
| DE |  10 2008 021 976  | 11/2009  |
| DE |   102008021976 A1 * | 11/2009 |

\* cited by examiner

*Primary Examiner* — Ramya Burgess
*Assistant Examiner* — Timothy M Hannon
(74) *Attorney, Agent, or Firm* — Kramer Levin Naftalis & Frankel LLP

(57) ABSTRACT

A motor vehicle driven by an internal combustion engine is equipped with at least two auxiliary units and with an electric machine connected to a power source. The electric machine can be coupled to the auxiliary units by means of a dual clutch device. A control device can actuate the dual clutch device for coupling the auxiliary units to the electric machine according to preselected priorities. One or the other auxiliary unit, or all auxiliary units, or no auxiliary unit may be coupled to the electric machine.

13 Claims, 2 Drawing Sheets

MOTOR VEHICLE HAVING AUXILIARY UNITS DRIVEN BY AN ELECTRIC MOTOR

CROSS-REFERENCE TO RELATED APPLICATION

This application claims the benefit of DE 10 2012 014 020.7 filed on Jul. 14, 2012, the disclosure of which is hereby incorporated herein by reference in its entirety.

FIELD OF THE INVENTION

The present invention generally relates to a motor vehicle having an internal combustion engine. More particularly, the present invention relates to a vehicle having at least two auxiliary units, an electric machine that can be connected to a power source and that can optionally be coupled to the auxiliary units by a clutch device, and a control device for actuating the clutch device for coupling the auxiliary units to the electric machine according to defined priorities.

BACKGROUND OF THE INVENTION

A motor vehicle of the general type under consideration is described in DE 10 2008 021 976 A1. The electric machine is drive-connected at least intermittently via a belt drive to the auxiliary units in order to optionally drive the auxiliary units. The motor vehicle has a first clutch device by means of which the internal combustion engine can be coupled rotationally to the electric machine. As a result at least intermittent mechanical driving of the electric machine by the internal combustion engine is enabled. The electric machine is arranged substantially parallel to the auxiliary units, which are likewise arranged parallel to one another, and is optionally drive-connected to the auxiliary units via a belt drive and in each case a clutch for each auxiliary unit. The auxiliary units are assigned priorities in accordance with their importance. For example, a power steering pump for power steering is allocated a high priority. An air compressor may sometimes be mounted downstream of the power steering pump as a result of the compressed air reservoir. Further auxiliary units can thus also be operated as a function of the vehicle status with different priorities, which may also change as a function of status. The classification of these priorities can be carried out by the control device. The spatial arrangement of the auxiliary units requires separate clutches for each auxiliary unit, which leads to increased construction outlay. The power of the electric machine is adjusted to driving several auxiliary units via clutches and belt drives or pinions. In order to achieve a reduced power output to the auxiliary units during the starting phases of the internal combustion engine, the priorities for driving the auxiliary units are set such that, for example, a power steering pump for power steering is allocated high priority, while an air compressor may sometimes be mounted downstream of the power steering.

SUMMARY OF THE INVENTION

Generally speaking, against this background, it is an object of the present invention to structurally simplify the driving of at least two auxiliary units by an electric machine without overloading the electric machine during coupling with the auxiliary units.

The invention accordingly proceeds from a motor vehicle having an internal combustion engine for driving the vehicle, the vehicle having at least two auxiliary units and an electric machine that can be connected to a power source and that can optionally be coupled to the auxiliary units by means of a clutch device, and a control device for actuating the clutch device for coupling the auxiliary units to the electric machine according to defined priorities. According to an embodiment of the present invention, the clutch device can be formed as a dual clutch, and two auxiliary units can be coupled to the electric machine by means of the dual clutch, wherein in each case one or the other auxiliary unit or both auxiliary units or no auxiliary unit can be coupled to the electric machine.

The use of a dual clutch makes it possible to optionally couple two auxiliary units to the electric machine in an installation space-saving and cost-saving manner. Accordingly, in each case only one motor-operable electric machine and its control unit is required for each two auxiliary units, and the actuation of a dual clutch advantageously requires only one simplified control device. According to one formative characteristic of the dual clutch, the dual clutch has a shared input side and two output sides. It can, however, also be used so that it has two input sides and one shared output side. The dual clutch can be driven on the input side, while the dual clutch itself can drive shafts connected on the output side.

The electric machine is preferably formed as a pancake motor with a rotor disk and a stator encompassing the latter, and in each case one clutch of the dual clutch is arranged on each axial side of the rotor disk and interacts therewith. In an alternative construction, both clutches of the dual clutch can be arranged radially on top of one another, wherein the radially inner clutch can be connected on the output side to a central shaft and the radially outer clutch can be connected on the output side to a hollow shaft that concentrically receives the central shaft, and both auxiliary units can be arranged on only one side of the electric machine or the dual clutch.

In both constructions, the dual clutch ensures independent coupling and uncoupling of the two auxiliary units to only one electric machine. This results in savings in terms of components and installation space and a reduction of complexity, which translates to a salutary reduction in manufacturing costs.

Also, the clutch parts, arranged on each side of the rotor disk, of the dual clutch can be formed as a pressure plate and as a clutch disk fastened on in each case a half-shaft, and the two half-shafts can be drive-connected to the assigned auxiliary units by means of drive connections.

Furthermore, both half-shafts can be axially spaced apart from one another, the rotor shaft can be arranged coaxially within both the half-shafts, the rotor disk can be connected to the rotor shaft and arranged axially between the two half-shafts, and the rotor shaft can be coupled by means of a first shiftable clutch to the internal combustion engine or by means of a second shiftable clutch to a transmission output arranged downstream of the internal combustion engine in terms of drive. As a result of the connection of the central rotor shaft to the internal combustion engine or to the transmission output, which is made possible by means of the two clutches of the dual clutch, both auxiliary units can also be driven by an internal combustion engine or by the vehicle wheel output.

By closing the first clutch, a flow of force can be conducted directly from the internal combustion engine to the electric machine so that the electric machine, which is generator-driven, can additionally contribute to power generation in the on-board vehicle electrical system insofar as driving of the then uncoupled auxiliary units is not required at that time. In the case of a correspondingly powerful configuration of the electric machine, the electric machine, which is in motor operation, can also serve to start the internal combustion engine. In the case of a flow of force from the transmission output to the electric machine, the electric machine, in generator recuperation mode, can generate electrical energy and supply it to the on-board vehicle electrical system.

Irrespective of a connection of the electric machine to the internal combustion engine or to the transmission output, recuperation operation is also possible if the electric machine is mechanically driven by one of the auxiliary units. This may, for example, be the case if an air compressor can be driven electromotively by means of the electric machine—the compressed air generated by the air compressor being supplied to a compressed air reservoir. The compressed air can then be released from the compressed air reservoir in the direction of the compressor so that movement of its drive shaft is effected, insofar as too much compressed air is present in the compressed air reservoir for a current operating situation and use in the near future is also not likely, e.g., after parking the vehicle at a depot, removal of the ignition key and waiting for a period of time. As a result, the air compressor then drives the electric machine mechanically so that the electric machine, switched into its generator operation, can supply electricity to the on-board vehicle electrical system or to its battery.

As a result of the proposed arrangement of the drive of the two auxiliary units, the power of the electric machine can be dimensioned such that it corresponds to the total formed from a maximum value of the power requirement of one of the two auxiliary units and the permanent load of the other auxiliary unit. The maximum value of one auxiliary unit is achieved, for example, in a start-up phase thereof. As a result, the power of the electric machine can be restricted to approximately three-quarters of the power that would be required if two auxiliary units were driven simultaneously by the electric motor in the least expedient case of a start-up phase. The start-up of the subsequently coupled auxiliary unit is facilitated by the rotating mass of the electric machine and the mass of the auxiliary unit coupled to it. The electric machine can be correspondingly dimensioned to be smaller, lighter and thus of lower cost.

The control device can preferably comprise a priority circuit set up to prevent both auxiliary units being coupled simultaneously to the electric machine by means of the dual clutch. The priority circuit can, for example, be set up such that the auxiliary unit that is in the least expedient state of a starting phase is first coupled to the electric motor by means of the dual clutch. The priority circuit in the control device can, however, be set up such that the auxiliary unit, which in a current operating situation for fault-free operation at the time has the highest priority of use, i.e. is most urgently required, is first coupled to the electric machine by means of the dual clutch. Potential operating situations may be, for example, driving the vehicle at a depot, on an upward slope or on a downward slope.

In each case, an electric machine can be coupled to two auxiliary units selected from the group comprising an air compressor, air-conditioning compressor, hydraulic pump for steering and other movable devices, fan, motor oil pump, transmission oil pump, water pump and the like. It is, however, also possible to couple several auxiliary units to the electric machine with, in each case, one clutch of the dual clutch insofar as these auxiliary units are drive-connected to the output side of one clutch of the dual clutch or to its half-shaft. It should be noted, however, in this embodiment, the plurality of auxiliary units for each clutch of the dual clutch are substantially simultaneously connected to the electric machine or separated therefrom.

Still other objects and advantages of the present invention will in past be obvious and will in part be apparent from the specification.

The present invention accordingly embodies features of construction, combinations of elements, and arrangement of parts, all as exemplified in the following detailed disclosure, and the scope of the invention will be indicated in the claims.

BRIEF DESCRIPTION OF THE DRAWING

For a fuller understanding of the inventive embodiments, reference is had to the following description taken in connection with the accompanying drawing in which.

LIST OF REFERENCE NUMBERS

Figure 1:
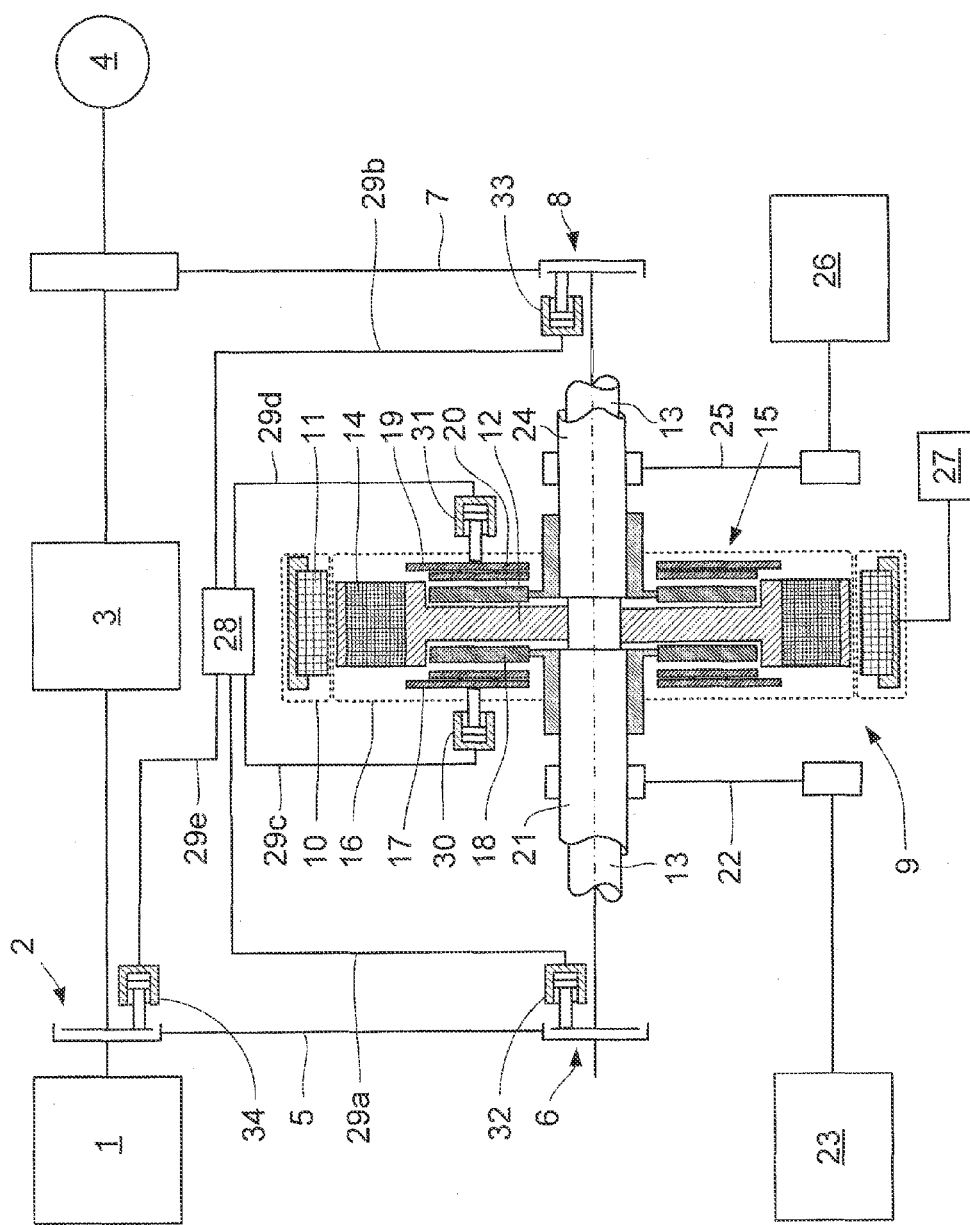
FIG. 1 is a schematic representation of a motor vehicle drivetrain according to an exemplary embodiment of the present invention.
Figure 2:
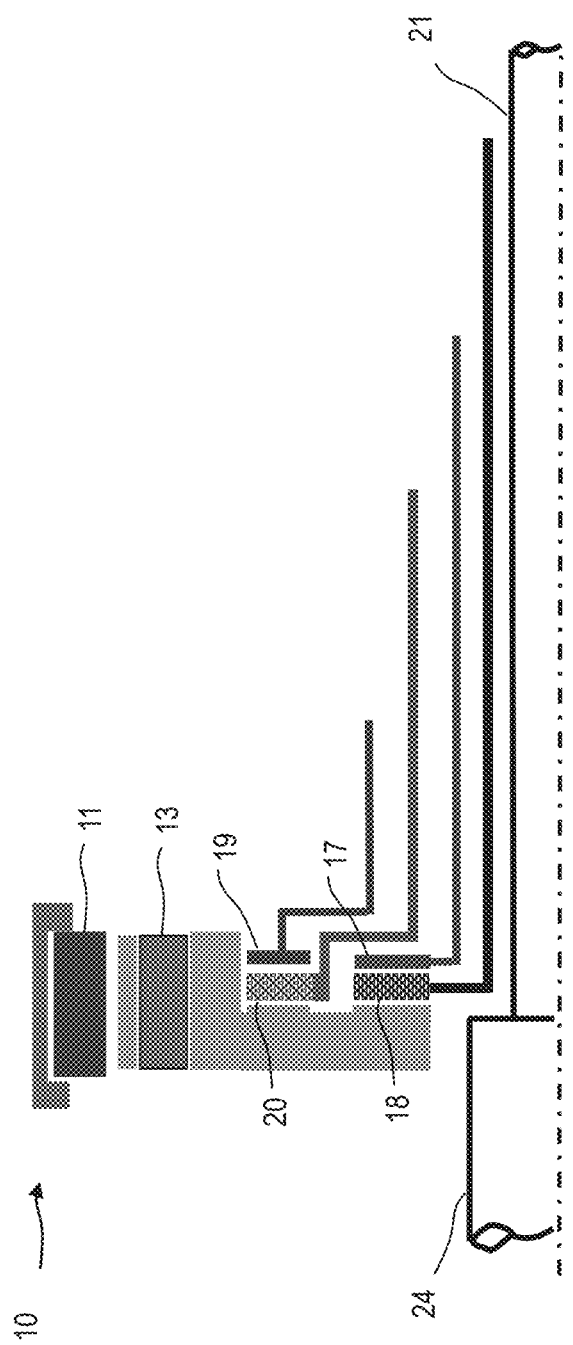
FIG. 2 is a schematic representation of a motor vehicle drivetrain according to another exemplary embodiment of the present invention.

1 Internal combustion engine
2 Starting clutch
3 Transmission
4 Wheel drive
5 First drive connection
6 First clutch
7 Second drive connection
8 Second clutch
9 Electric machine
10 Stator
11 Magnet or coil at the stator
12 Rotor disk
13 Rotor shaft
14 Coil or magnet at the rotor
15 Dual clutch
16 Rotor
17 First pressure plate
18 First clutch disk with friction lining
19 Second pressure plate
20 Second clutch disk with friction lining
21 First half-shaft
22 Third drive connection
23 First auxiliary unit
24 Second half-shaft
25 Fourth drive connection
26 Second auxiliary unit
27 Power source
28 Control device
29a First control line
29b Second control line
29c Third control line
29d Fourth control line
29e Fifth control line
29f Sixth control line
30 First actuator
31 Second actuator
32 Third actuator
33 Fourth actuator
34 Actuating element at the starting clutch

DETAILED DESCRIPTION OF THE PREFERRED EMBODIMENTS

Referring now to the drawing FIGURE, a drivetrain of a motor vehicle is represented schematically. The drivetrain has an infernal combustion engine 1, which is connected to a wheel drive 4 via a starting clutch 2 and a transmission 3. Starting clutch 2 can be activated by means of an assigned actuating element 34, which is connected to a control device 28 via a fifth control line 29e. Actuating element 34 is formed as a hydraulically or pneumatically operable piston/cylinder arrangement.

Internal combustion engine 1 is connected to the input part of a first clutch 6 in terms of drive by means of a first drive connection 5, for example, in the form of a belt drive. First clutch 6 can be coupled with its output side to a rotor shaft 13 of an electric machine 9 in the form of a pancake motor. A second drive connection 7, for example, in the form of a belt drive, connects the output of transmission 3 to the input part of a second clutch 8, which can likewise be coupled to rotor shaft 13. In the exemplary embodiment depicted in FIG. 1, both clutches 6 and 8 can be operated by means of assigned third and fourth actuators 32, 33, which are connected via a first or a second control line 29a, 29b to control device 28. Both actuators 32 and 33 are formed as hydraulically or pneumatically operable piston/cylinder arrangements.

Electric machine 9 can alternately be operated either as a generator or as a motor. It is connected to a power source 27 and has a stator 10 with a permanent magnet or electromagnet 11 as well as a rotor disk 12, wherein rotor disk 12 bears an electromagnet or permanent magnet 14 radially on the outside.

A dual clutch 15 is arranged radially inside the electromagnet or permanent magnet 14 on rotor disk 12. Dual clutch 15 has, in normal operation, a drivable input side (rotor shaft 13) as well as two driven output sides (half-shafts 21 and 24). For this purpose, dual clutch 15 has, on one axial side of rotor disk 12, a first pressure plate 17 and a first clutch disk 18 with a friction lining, and on the other axial side of rotor disk 12 a second pressure plate 19 and a second clutch disk 20 with a friction lining. First clutch disk 18 is fixedly connected to a first hollow half-shaft 21 and arranged with this coaxially and rotatably on rotor shaft 13. Second clutch disk 20 is fixedly connected to a second hollow half-shaft 24 and is likewise arranged coaxially and rotatably on rotor shaft 13. First pressure plate 17 of dual clutch 15 is displaceable axially in the direction of first clutch disk 18 by means of a first actuator 30, which is connected via a third control line 29c to control device 28. Second pressure plate 19 of dual clutch 15 is axially displaceable in the direction of second clutch disk 20 by means of a second actuator 31, which is connected via a fourth control line 29d to control device 28. In the exemplary embodiment depicted in FIG. 1, both cited actuators 30, 31 are formed as hydraulically or pneumatically operable piston/cylinder arrangements.

Both half-shafts 21, 24 are arranged rotatably on rotor shaft 13 at an axial distance to one another and accommodate between them rotor disk 12, which is fixedly connected to rotor shaft 13. In alternative embodiments, half-shafts 21, 24 may be arrange concentrically with half-shaft 21 being a central shaft and half-shaft 24 being a hollow shaft that concentrically receives the half-shaft 21. Using this construction, both auxiliary units can be arranged on only one side of the electric machine or the dual clutch.

First half-shaft 21 is connected via a third drive connection 22, for example, in the form of a belt drive, to a first auxiliary unit 23, for example, an air compressor, while second half-shaft 24 is connected via a fourth drive connection 25, for example, in the form of a belt drive, to second auxiliary unit 26, for example, an air-conditioning compressor.

By means of control device 28, both clutches of dual clutch 15 can optionally be coupled either to first auxiliary unit 23 or to second auxiliary unit 26 or to both auxiliary units 23, 26 substantially simultaneously, or the two clutches of dual clutch 15 interrupt the drive connection to both auxiliary units 23, 26 so that none of auxiliary units 23, 26 is driven by electric machine 9.

First drive connection 5 between internal combustion engine 1 and rotor shaft 13 via first clutch 6 and second drive connection 7 between transmission 3 and second clutch 8 to rotor shaft 13 can likewise be controlled by means of control device 28 so that rotor shaft 13 and thus electric machine 9 can optionally be driven by internal combustion engine 1 or by transmission 3 coupled to wheel drive 4 in order, for example, in disk or brake operation, to supply energy to electric power source 27 if electric machine 9 is switched to generator operation.

In the exemplary embodiment depicted in FIG. 1, rotor disk 12 is connected in a rotationally conjoint manner to rotor shaft 13. It is, however, also possible to form rotor shaft 13 as a fixed axle (i.e., arrange it fixedly on the housing) on which rotor disk 12 is then arranged so as to be mounted rotatably. In such case, a drive connection of auxiliary units 23, 26 to internal combustion engine 1 or to the transmission output would not be possible. First and second clutch 6, 8 as well as first and second drive connection 5, 7 would then not be present.

In addition to the advantages of omitting a separate drive motor for at least one auxiliary unit, the framework conditions for the design of the drive of both auxiliary units 23, 26 also change. Two auxiliary units 23, 26, for example, an air compressor and a power steering pump, require in each case, for example, a maximum drive power of about 5 kW, which corresponds to the maximum requirement in the least expedient case in the case of a start-up phase of the compressor and the power steering pump at an ambient temperature of about −40° C. and a high counter pressure. This means that electric machine 9 would have to have a power output of about 10 kW (=100%) for the substantially simultaneous starting up of the compressor and the power steering pump. With the inventive arrangement of a dual clutch 15 at electric motor 9, it is possible, by introducing a priority circuit that prevents both auxiliary units 23 and 26 from starting up simultaneously, to reduce the required power output of electric machine 9 to approximately 7.5 kW insofar as it is assumed that one of both auxiliary units 23 or 26 is already running with a permanent load of about 2.5 kW and a further auxiliary unit 26 or 23 is activated with a maximum power requirement. Taking into account the centrifugal mass of electric machine 9 formed as a pancake motor 9 and the rotating auxiliary unit, it is likely that the required power can be reduced by about 30% to about 7 kW or less, which leads to savings in terms of manufacturing costs, the required installation space and complexity.

In each case, an electric machine 9 can be coupled to two auxiliary units 23, 26, which are selected from the group comprising an air compressor, air-conditioning compressor, hydraulic pump for steering or other movable devices, fan, motor oil pump, transmission oil pump, water pump and the like. It is, however, also possible to substantially simultaneously couple several auxiliary units to the electric machine with, in each case, one clutch of the dual clutch, as discussed above.

It will thus be seen that the objects set forth above, among those made apparent from the preceding description, are efficiently attained, and since certain changes may be made in the above constructions without departing from the spirit and scope of the invention, it is intended that ail matter contained in the above description or shown in the accompanying drawing shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A motor vehicle comprising:
    an internal combustion engine;
    at least two auxiliary units;
    an electric machine connected to a power source;
    a dual clutch device configured to couple the at least two auxiliary units to the electric machine, the dual clutch device comprising a first clutch, a second clutch, a first half-shaft coupled to the first clutch, and a second half-shaft coupled to the second clutch, wherein the first half-shaft and the second half-shaft are arranged coaxially about a rotor shaft; and
    a control device configured to actuate the dual clutch device to couple one, all or none of the at least two auxiliary units to the electric machine based on preselected priorities.

2. The motor vehicle as claimed in claim 1, wherein power of the electric machine is dimensionable to correspond to a total of a maximum value of a power requirement of one of the at least two auxiliary units and a permanent load of the other of the at least two auxiliary units.

3. The motor vehicle as claimed in claim 1, wherein the control device comprises a priority circuit configured to prevent the at least two auxiliary units from being coupled simultaneously to the electric machine by the dual clutch device.

4. The motor vehicle as claimed in claim 3, wherein the priority circuit is configured to cause an auxiliary unit of the at least two auxiliary units that is in a least expedient state of a starting phase of the internal combustion engine to first be coupled to the electric motor by the dual clutch device.

5. The motor vehicle as claimed in claim 3, wherein the priority circuit is configured to cause an auxiliary unit of the at least two auxiliary units that, in a current operating state for fault-free operation, has a highest priority of use to first be coupled to the electric machine by the dual clutch device.

6. The motor vehicle as claimed in claim 1, wherein the at least two auxiliary units include at least one of an air compressor, an air-conditioning compressor, a hydraulic pump, a water pump, a fan, a motor oil pump and a transmission oil pump.

7. A motor vehicle comprising:
    an internal combustion engine;
    at least two auxiliary units;
    an electric machine connected to a power source;
    a dual clutch device configured to couple the at least two auxiliary units to the electric machine; and
    a control device configured to actuate the dual clutch device to couple one, all or none of the at least two auxiliary units to the electric machine based on preselected priorities, wherein the electric machine is a pancake motor having a stator and a rotor disk, and wherein a first clutch of the dual clutch device is arranged on a first side of the rotor disk and a second clutch of the dual clutch device is arranged on a second side of the rotor disk.

8. The motor vehicle as claimed in claim 7, wherein the first and second half-shafts are drive-connected to the at least two auxiliary units by drive connections, and wherein the first and second clutches each includes a pressure plate and a clutch disk, the clutch disk of the first clutch being fastened on the first half-shaft, and the clutch disk of the second clutch being fastened on the second half-shaft.

9. The motor vehicle as claimed in claim 8, wherein the first and second half-shafts are axially spaced apart from one another, and further comprising a rotor shaft arranged coaxially within the first and second half-shafts.

10. The motor vehicle as claimed in claim 9, wherein the rotor disk is connected to the rotor shaft and is arranged axially between the first and second half-shafts.

11. The motor vehicle as claimed in claim 9, wherein the rotor shaft is coupleable to one of (i) the internal combustion engine via a first shiftable clutch and (ii) a transmission output arranged downstream of the internal combustion engine via a second shiftable clutch.

12. A motor vehicle comprising:
    an internal combustion engine;
    at least two auxiliary units;
    an electric machine connected to a power source;
    a dual clutch device configured to couple the at least two auxiliary units to the electric machine; and
    a control device configured to actuate the dual clutch device to couple one, all or none of the at least two auxiliary units to the electric machine based on preselected priorities, wherein the first and second clutches are arranged radially on top of one another, wherein the first clutch is a radially inner clutch being connectable on an output side to the first half-shaft, and wherein the second clutch is a radially outer clutch being connectable on the output side to the second half-shaft.

13. The motor vehicle as claimed in claim 12, wherein:
    the first half-shaft is a central shaft;
    the second half-shaft is a hollow shaft configured to concentrically receive the central shaft; and
    the at least two auxiliary units are arranged on only one side of the electric machine.

* * * * *